United States Patent [19]

Reiffel

[11] 3,718,759
[45] Feb. 27, 1973

[54] AUDIO-VISUAL TEACHING SYSTEM AND STUDENT RESPONSE APPARATUS

[75] Inventor: Leonard Reiffel, Chicago, Ill.

[73] Assignee: Telestrator Industries, Inc., Chicago, Ill.

[22] Filed: April 5, 1971

[21] Appl. No.: 131,523

Related U.S. Application Data

[63] Continuation-in-part of Ser. No. 776,724, Nov. 18, 1968, abandoned.

[52] U.S. Cl. ..........................178/6.8, 35/9, 178/19, 178/DIG. 35
[51] Int. Cl. ..........................H01j 39/29, H04n 7/18
[58] Field of Search.....178/6.8, DIG. 1, DIG. 6, DIG. 35,
178/18, 19, 5.6; 35/9; 340/324 A

[56] References Cited

UNITED STATES PATENTS

| | | | |
|---|---|---|---|
| 2,241,544 | 5/1941 | Dreyer | 178/6.8 |
| 2,487,641 | 11/1949 | Denk | 178/6.8 |
| 2,986,596 | 5/1961 | Hammond | 178/5.6 |
| 3,413,515 | 11/1968 | Haring | 178/6.8 |

Primary Examiner—Howard W. Britton
Attorney—Albert Siegel

[57] ABSTRACT

An audio-visual teaching system whereby program-controlled responses in the form of linear drawings or notations or the like may be viewed as superimposed on a basic image and may be added by both the student and instructor with a probe member. Student must answer question correctly in some embodiments for program to proceed. In some embodiments, if the student answers incorrectly, a separate related system is energized which provides additional instruction leading toward the correct answer. System includes means for projecting a visual image onto a viewing face of a long residence time visual display plate and means for pre-recording at sub-video frequencies, dynamic linear additions to a background image as well as voice and other audio data. The background images are optionally used herewith. Such teaching system eliminates the necessity in certain instructional situations for using an electronic computer as required in the systems of the prior art and provides inexpensive programming and reproduction means.

6 Claims, 9 Drawing Figures

AUDIO-VISUAL TEACHING SYSTEM AND STUDENT RESPONSE APPARATUS

REFERENCE TO OTHER APPLICATION

This application is a continuation-in-part of my co-pending application Ser. No. 776,724 filed Nov. 18, 1968 and now abandoned.

BACKGROUND OF THE INVENTION

This invention relates to an audio-visual teaching system and more particularly to such a system in which linear drawings or notations may be added to a blank background or a background visual image by both the student and the instructor in such a way to provide most of the effects of full color or black and white motion picture or video presentation without the use of complex or expensive equipment. Such system employs novel responder techniques which require that the viewer-student answer questions by spatial visual responses before the program proceeds further and provides means whereby student answers are visually added to the background image. By my present invention, I go beyond more motion picture presentations and the like in that many of the characteristics of the give and take of a personally delivered "live lecture" are reproduced by this present, relatively inexpensive automatic means.

As is known to those skilled in the art, there are presently available a number of audio-visual teaching systems of varying degrees of sophistication. At one end of the spectrum are simple film strip projectors with or without related audio whereby an individual student or class essentially receives a lecture without intermittent feedback from the student. At the other extreme, as of today's technology, are computer controlled highly individualized systems whereby the student is required to answer certain pre-programmed questions-respond to the system-and to the student proceeds at his own pace.

Film strips or motion pictures or video tape recordings are relatively easy and inexpensive to program and produce but lack the flexibility from the standpoint of the instructor and student and also the student-instructor interplay which so greatly add to the realism of the recorded "live-lecture" presentation. Such interplay appears to be most important in the educational process. Certain modifications have been made in the simpler systems which do permit a limited student feedback and pace control. For example, there are film strip program with related audio having questions at spaced intervals and requiring the correct response principally by operations of push-buttons or the like before the film strip proceeds to the next position. Teaching machines of this nature are, of course, quite well known to those skilled in the art. While they have been accepted in actual practice, they still present limitations in teacher-student reaction.

There are also teaching systems employing an electronic digital computer as one, but very substantial, component thereof. With such devices there is ready interplay-feedback-between student and computer but the initial equipment investment required is relatively great and the educational topic must be programmed into computer language. Between the cost of computers and the cost and difficulty of programming, only a relative handful of these more sophisticated systems have found their way into the classroom.

In distinction to those teaching systems of the prior art, I have invented a novel teaching system which is relatively inexpensive, easy to use and manufacture, and flexible for both the student and the instructor.

Accordingly, a principal object of my invention is to provide a teaching system which is readily programmed and which has dynamic, time-dependent, interest sustaining programming in pre-recorded form and wherein the moving portions of superimposed visual data are stored on ordinary audio magnetic tape or other low frequency (sub-video) recording media such as phonograph records and wherein the student adds to the program materials in a visual manner.

Another object of my invention is to provide a teaching system wherein a projected, visual image is visually modified in a dynamic manner by linear forms which are electrically added to the total image seen by the observer and wherein the visual modification is accomplished quite readily by the student and the instructor.

Still another object of my invention is to provide a novel teaching system wherein the student controls the pace of the program and in the event that the student answers a question incorrectly, additional supplemental, instructional information is presented to him in both visual and audio form.

Still a further object of my invention is to provide means permitting an individual teacher to pre-record a voice and visual presentation instructionally comparable to a motion picture or video tape presentation using only audio frequency recording equipment plus sequences of static background visual images such as films, film strips or the printed page of a book and wherein the student in responding to the pre-programmed lesson visually adds to such lesson.

Still another object of my invention is to provide a dynamic audio-visual program in recorded form without the bulk and expense of video tape or motion picture equipment.

A more specific object of my invention is to provide a teaching system which includes:

a. Means for projecting a visual image onto a long residence time viewing plate, (which projecting means may be optional herewith);

b. The viewing plate and apparatus coacting therewith;

c. Means for controlling and superimposing a dynamic display on the viewing plate wherein the viewing plate is normally opaque and diffusely reflective but is so constructed that areas thereof, as determined by the input thereto by both student and instructor, may be readily caused to glow or be converted to a transparent state at the control of either the instructor directly or by means of pre-programmed sub-video frequency (ordinarily in the audio frequency range) magnetic tape and which similarly is visually modified by the student;

d. Optionally, in some embodiments herein, additional visual and audio information is provided to the student in the event that the question posed is answered incorrectly.

Still another object of my invention such an audio-visual teaching device wherein at least one of the actuating signals for the visual display, either is pre-programmed or is one which stems from the viewer response and is controlled by electrical communication means operating at frequencies and band widths ordinarily capable of carrying only audio commentary, i.e., ordinary broadcast radio frequencies and band widths.

These and other objects, features and advantages of my invention will become apparent to those skilled in this particular art from the following detailed disclosure thereof and the accompanying drawings in which:

The invention will be described in conjunction with such drawings, wherein such characters of reference designate like parts in the several views.

Figure 1:
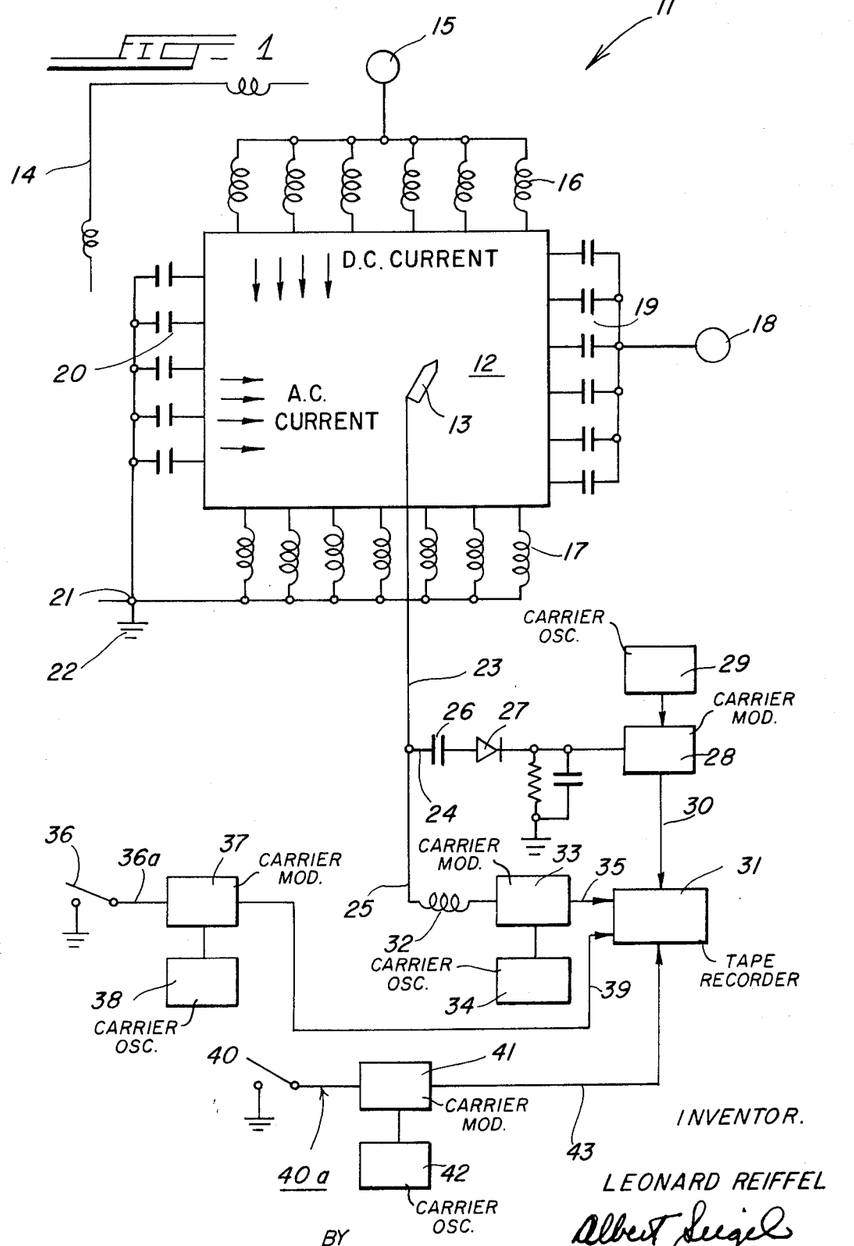
FIG. 1 is a block diagram of a signal generator component for use herewith.

One of the major components of the present teaching system, a manual signal display generator 11 is illustrated in FIG. 1. Such generator 11 is used by both the instructor-programmer in programming the present system and by the student in learning and interacting with this teaching apparatus. The generator may be of either the quantized or analog-type and provides electrical information representing the X and Y coordinates of a probe or a pointer-like member touching or coacting with or approaching a reference plane under the control of either the student or instructor. FIG. 1 discloses an analog-type generator. In any event the output of said generator is ultimately recorded and used in analog form. In the preferred embodiment hereof, such generator 11 is in the form of a light transparent, electrically conducting thin plate.

Such signal producing means 11 consists of an electrically active plate 12 and accompanying pencil-like probe 13 and circuitry. The instantaneous X and Y position of the probe as it contacts, in some embodiments hereof, the plane of the plate with respect to a set of electrically established coordinates within the plate may be indicated electrically in numerous ways. For example, if one establishes an AC voltage or frequency $f_1$ current flow in the X direction in the conductive plate 12 and a DC voltage or frequency $f_2$ current flow in the Y direction thereof, the relative X and Y positions of the point of contact of the probe 13 with the plate with respect to the left and lower edges of the plate or some other reference point, will immediately be given by the fraction of the total AC (or $f_1$) and DC (or $f_2$) applied to the plate which is picked off by the electrically conducting probe 13.

The signal generator 11 is confined within an electrically insulating frame 14 surrounding the conductive plate 12. Such plate 12 is preferably of a uniform, continuously resistive nature and may be formed preferably for example, of a tin oxide coated electrically conducting glass or in the alternative and for most purposes somewhat less desirable of an electrolytic solution or of a conducting gel. It is important in several embodiments hereof that such plate 12 be of a continuously conducting nature.

The probe 13 is employed in conjunction with the plate 12. The coaction of the probe and plate is employed to determine and read the X and Y positions of the probe at its point of contact with the plate. Many different means for this are available and although only one such means is subsequently described, it will, of course, be understood that such various other means may be employed herewith. For example, a diode switching system may be used or a stylus attached by a rigid or string-like member to a pair of potentiometers may also be used. Additionally, a digital position data generator in which the probe position is identified by the use of a pair of inter-insulated, intersecting, open wire grid works or other conducting lines may also be used.

In the embodiment of such plate illustrated in FIG. 1, a DC potential is impressed in a vertical direction across plate 12 by a DC source generator 15 though a series of inductors 16 and 17. At the same time, an AC potential is impressed in the horizontal direction across such electrically conducting transparent member 12 by an AC source or generator 18 through a bank of capacitors 19 and 20 which block any effect of the DC circuit on the co-acting AC circuit and vice versa. It will, of course, be understood that the AC and DC actuation of the generator 11 could be reversed and certainly other means of actuation, e.g., diode switching as noted above, could be employed.

Proceeding with the description, the AC and DC signals stemming from the generators 15 and 18 are connected with a ground 22 by the tie point contact 21. By means of the foregoing an AC signal is superimposed upon the DC and the amplitudes of the signal at any point on the plate 12 are proportional to the horizontal and vertical distances of the probe from a reference point, for example, the lower lefthand corner of such plate.

The probe 13 picks off a mixed electrical signal from the plate 12 which signal contains information for determining the position of the exact point of contact between probe and plate, i.e., such signal provides the X and Y coordinates of probe position. The signal contains both an AC component and a DC component which respectively signify the horizontal and vertical distances from a reference point which preferably is the lower left-hand corner of the plate. Such mixed signal is then split into its AC and DC components which are subsequently used in this invention as hereinafter described. In some embodiments hereof, such AC and DC components after suitable changes of form are fed directly into, for example, an electrostatic storage display tube or a mechanical storage member, both of which are described below or in other embodiments hereof are merely fed into different tracks of an audio magnetic recorder or via different carrier frequencies fed into a single track of a tape recorder or a phonograph record. This is to say the present system can be used "live" or its input-output signals may be stored for use at a later time.

The mixed electrical signal picked off by probe 13 is conveyed via lead 23 to a number of components which serve essentially to split the signal into its AC and DC components and to place them in such a form in which they can be subsequently used. Probe lead 23 is split into two electrical leads 24 and 25. As illustrated in FIG. 1, the mixed signal in lead 23 first encounters a capacitor 26 which blocks the DC component but permits the AC signal to proceed.

Such signal is then passed through a rectifier 27 where it is converted to DC and from thence to a carrier modulator 23 operating in conjunction with a carrier oscillator 29. The carrier envelope stemming from the latter, contains probe X coordinate position information which in FIG. 1 is fed via lead 30 to a magnetic tape recorder 31 where it is stored.

Concurrently, the DC component of the mixed signal in lead 25 picked up by probe 13 is fed through an inclusive choke 32 to produce a slowly varying DC and from thence into a second carrier modulator 33 operating in conjunction with a second carrier oscillator 34. The carrier envelope stemming from this modulator and oscillator is fed via lead 35 into, for example, the magnetic recorder 31 where it too is stored for subsequent use herewith.

In employing a long residence time display tube such as an electrostatic storage tube or other comparable display members in addition to requiring electrical signals controlling the X and Y coordinate positions of the writing member two other signals are needed, namely a first signal to "erase" the visual signal being displayed on its face plate and a beam "on-off" signal. These additional features, which operate in conjunction with the electrical system of the foregoing display generator, will next be described.

I provide an erase switch 36 (with an appropriate electrical energy source and circuit, not illustrated). When such switch is closed, an electrical signal is conveyed via lead 36a to a third carrier modulator member 37, operating in conjunction with a third carrier oscillator 38. Lead 39 conveys the signal from the modulator 37 to the magnetic recorder 31 where it is recorded upon the magnetic tape thereof for subsequent use. The net result is that by the closing of switch 36, a superimposed image on the storage plate used herewith is erased if the system is being operated "live" or such erase signal is programmed in recorder 31.

The fourth required signal, the beam on-off mechanism is also illustrated in FIG. 1. This can be a separate switch and is shown as such in FIG. 1 but for ease of operation, I prefer that such switch be controlled by the tip of the probe 13 so that when the probe point is depressed against plate 12, such switch is closed. For purposes of illustration, I denote such switch by the numeral 40 in FIG. 1. When the switch is closed, an electrical signal is conveyed via lead 40a to a fourth carrier modulator number 41 operating in conjunction with a fourth carrier oscillator 42. Lead 43 conveys the signal from the modulator 41 to the magnetic recorder 31 where it too is recorded for subsequent use in the present system.

The signal generator is used by the instructor in programming and by the student in responding and adding to the visually displayed preprogrammed material.

Figure 2:
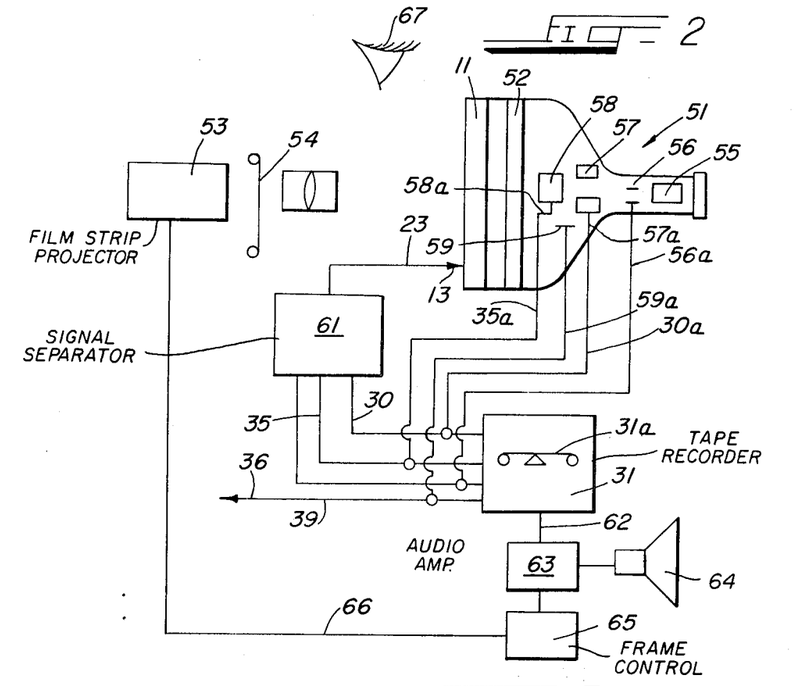
FIG. 2 schematically illustrates one embodiment hereof.

Reference should next be had to FIG. 2 which illustrates one embodiment hereof.

In this embodiment an electrostatic storage display tube of the standard type commercially available, is referred to by numeral 51. The white phosphor screen, i.e., viewing plate, of such tube, noted by numeral 52, is employed in such embodiment as the screen onto which is projected a full color or black or white visual image through the transparent plate member 11. The source of such visual image, which I refer to as the basic or background image, may be a film strip projector 35 illuminating the film strip 54 or the like. It is, of course, feasible to employ a motion picture projector and film in place of the film strip projector although this would be somewhat more expensive.

The electrostatic storage tube 51 has the usual components of such devices, namely an electron beam generator 55, an electron beam intensity control members 56, Y-axis deflection plates 57, X-axis deflection plate 58, and an erase pulse generating member 59. All such members function in the usual manner in the standard operation of an electrostatic storage display tube which tubes are presently commercially available.

To best describe my invention at this point, I will now briefly describe how the appropriate program—i.e., lesson-signals are recorded on the tape 31a in the most simple embodiment hereof. At the commencement of the programs, the instructor begins to view the image from projector 53 as projected on the face plate 52 of the electrostatic storage display tube. Audio commentary may be fed into the tape recorded 31 in a standard manner. As part of the visual program, for example, the instructor now wishes to add a visual image such as an arrow for emphasis to the basic scene image. The instructor "writes" the arrow on the generator plate 11 with the probe 13. The X and Y-coordinate signals from the probe are conveyed via lead 23 to a signal separator 61, the components of which were previously described in conjunction with FIG. 1—i.e., the AC and DC signal separating circuit thereof. From such separator leads 30 and 35 convey the coordinate voltage signals to tape 31a of the tape recorder 31. Suitable modulators and carrier oscillators can be interposed in these leads in the standard manner.

When the probe 13 is pressed against plate 11, the beam on-off switch 40 is closed and this signal too is stored on the magnetic tape 31a.

I would note that various X-Y coordinate signal generating members can be used in the present invention. These may take the form of several such devices which are commercially available for use in conjunction with video of other equipment. These may operate by the probe contacting a plate or moving in the area of the image.

As the arrow is being drawn by the instructor-programmer with probe 13, the arrow is formed, "written," so to speak, on the face plate 52 of the storage display tube 51 by the electron beam generator 55 thereof moved under the control of the signals being imparted to the Y and X-axis deflection plates 57 and 58, respectively. The signals to such plates are conveyed via leads 30a and 35a to lead 57a and 58a which also many contain standard amplifiers, etc. By this means, the probe coordinate signals are simultaneously recorded, programmed on tape 31a and visually seen as the arrow being drawn. Such programming procedure is elaborated upon subsequently.

In other embodiments hereof the X-Y signals are recorded for subsequent use and do not appear on the face plate 52.

When used at a later time the signals stored on the tape are fed into the storage tube 51. It should be noted that the electrical signals picked off the tracks of tape 31a are a complex mixture of modulated carriers which are first amplified in components functionally similar to component 61 and then separated into their various components. Such signal components essentially consist of the output of the first through fourth carrier modulators 28, 33, 37 and 41 which were previously described in conjunction with FIG. 1. These are the appropriate signals regarding the X and Y positions of the probe as programmed, and the beam "on-off" and intensity signals. The separated carrier signals coming from member 61 are each passed through a detector circuit therein which produces slowly varying quasi DC levels which are really the enveloped of the carriers. These are in turn applied via leads 56a, 58a and 59a to control member 56, X and Y-axis deflection plates 57 and 58 and the erase pulse member 59, respectively, of the storage tube 51 to control its functioning.

Additionally, an audio signal, if voice commentary is being used in conjunction with the visual image, as it is preferably used herewith, is picked off of the tape 31a and conveyed via lead 62 to an audio amplifier 63 and from thence actuates speaker 64. The film strip projector may also provide a frame change mechanism control 65 of known configuration feeding from the audio amplifier 63 back into projector 53 via lead 66.

The operation of the system as described in FIG. 2 has characteristics as follows:

First of all, it is noted that the basic image from the film strip projector 53 and film strip 54 is being projected onto the face plate 52 of the electrostatic storage member 51. This basic scene is perceived by the viewer's eye 67. Such scene is being passed through the transparent display generator plate 11.

In my invention, the projected image from the film strip 54 is visually modified in a dynamic way way by linear forms which are added to the total image received by the observer's eye. Such dynamic linear forms, e.g., arrows or circles, numbers and words for additional information, outlined drawings, etc., are by the use of the apparatus illustrated in FIG. 1, drawn out as glowing lines on the phosphor screen 52. These drawings are generated by and are under the control of electrical inputs from the standard X and Y deflection system circuits and intensity control circuit and are erased by the erase circuit of the storage display tube 51. Such controlling electrical inouts may be generated "live" by a teacher using the manual display generator previously described in FIG. 1 or in the preferred embodiment hereof the program preparation outputs are prerecorded on audio magnetic tape 31a or other audio frequency media and used at a later time to provide the controlling electrical inputs to the storage display tube as has been earlier described. In such preferred embodiment, the X and Y positions, intensity and erase data are in the form of modulated signals on one or more tracks of the magnetic tape. These various signals can be separated by standard methods at different carrier frequencies in the range, for example, of 0.1 to 25 kilo hertz are used for each function. Similarly and at the same time a synchronized audio commentary may be recorded on the same magnetic tape and accompany the dynamic visual additions to the background visual image. Furthermore, at the same time, frame change mechanisms may be likewise recorded on the tape.

It will be apparent to the reader that as thus far described the present system is quite comparable to my co-pending application entitled "Electronic Audio Visual Teaching System," U.S. Ser. No. 766,524, i.e., I have described a basic program illustrated on the face plate 52 which has been visually modified or added to by the instructor by the signals on the magnetic recording tape 31a. When the electrostatic storage tube 51 is used as a component of the system, such superimposed lines appear as glowing lines generated by the components of such storage tube.

In other embodiments hereof a visual image is not added to the background image but the representative signals thereof are merely recorded by either the programmer or student.

It should also be understood that the apparatus used by the student is essentially the same as that employed by the instructor-programmer.

For purposes of discussion, let me now say that after a sequence of instructional events upon playback of film strip 54 and tape 31a, the student-viewer is requested to answer certain questions programmed onto face plate 52 before the program may proceed. (In terms of this invention the word "program" means the basic image, e.g., film strip, and the instructor recorded audio and visual signals for use therewith.) For example, assume that a stationary image is now seen on plate 52 containing a question and four possible answers to such question, answers A, B, C and D. Also, assume that as part of such image there are four answer boxes also presented immediately to the left of each answer. In the simplest embodiment hereof, the student touches the probe 13 to what he considers to be the box representative of the correct answer. Such box or boxes appear through the plate 11 since it is transparent. In conjunction with FIG. 1, I have previously discussed how the X and Y coordinates of probe 13 may be generated and separated whereby signals are conveyed from the first and second carrier modulators 28 and 33. In FIG. 2, I represent such signal separators by member 61 which I refer to at times as the X and Y filter element. This serves to separate the X and Y component signals. Lead 35 conveys the X component signal from such separator 61 and lead 30 conveys the Y signals component from such separator. Leads 30 and 35 are split into two leads, one to drive the storage tube and one to drive the tape recorder. Standard signal amplifiers and conditioners are employed as required in these leads. By this means, the point of probe 13 in contact with plate 11 or line contact therewith, is formed as a glowing line on the face 52 of the electrostatic storage line. The student therefore can see by a glowing line where he has answered the question. For example, he may have a dot or an X in the answer box opposite answer A. In other embodiments hereof no such visual image need be generated.

At this point of the lesson there is a stationary picture on plate 52 which now has visible thereon the visual image generated by the student in answering the question. In order for the program to proceed, the question must be answered properly—i.e., the probe 13 must have been applied to the correct answer box area on plate 11. The voltage coordinates of the correct answer were previously recorded on e.g., tape 31a by the instructor originally. Thus, the X and Y voltages picked off by the probe 13 in the hands of the student are compared with a set of right answer signals programmed by the instructor and stored in the magnetic recorder 31. If the answer given by the student is correct, the tape recorder which at this point is unmoving starts up once more and among other things conveys a frame change signal via the frame change mechanism 65 back to the film strip projector 53 and the program continues. Timer-controlled frame change operation is also programmed on tape by the instructor.

In this simple embodiment of my invention, a more complex one of which will be subsequently described, the student is not given any additional instructions if he answers the question incorrectly; in a subsequent embodiment it may be seen how such additional information may be conveyed to the student which will assist him at arriving at the right answer.

Thus, the next matter to consider is whether or not the student has answered the question correctly by applying the probe to the proper area on plate 11. For this description I refer the reader to FIG. 3 which illustrates the electrical diagram of comparison and related apparatus. I would note that the X and Y coordinates of the proper answer are stored on the magnetic tape 31a of the magnetic recorder 31. These correct voltages must be compared with the X and Y voltages generated at the probe 13—plate 11 point of contact.

Figure 3:
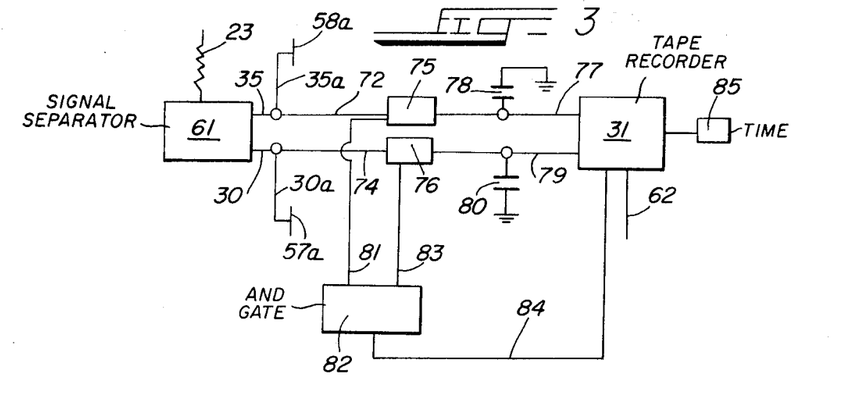
FIG. 3 schematically illustrates a wiring diagram for use herewith.

As set forth above, lead 35 carrying the X-component voltage of the signal generated by the student touching the probe to the plate is split into two leads 35a and 72. Lead 35a connects with lead 38a to actuate the X-axis deflection plates. At the same time, lead 72 directs such voltage into an X-voltage comparator member 75. Similarly, voltage in lead 30 is conveyed via lead 74 to a Y-voltage comparator 76 and the Y deflection plate 57a via lead 30a.

The correct X-coordinate voltage for the particular answer which is stored on the magnetic tape is conveyed from the tape recorder 31 by means of lead 77. Because at this point the tape recorder has stopped, I insert a capacitor 78 in such circuit which stores the tape generated signal and in turn feeds into the X-voltage comparator 75. Similarly, leads 79 and capacitor 80 convey and store the correct Y-voltage coordinate to the Y-voltage comparator 76. The correct X and Y voltages are stored in these long time constant capacitors just prior to shut-down of the tape recorder.

For better understanding assume that the X-coordinate voltage generated by the probe-plate is denoted as X and the stored voltage from the magnetic recorder is denoted as X'. Similarly, the Y-coordinate voltage from the probe-plate will be referred to as voltage Y and the Y-voltage from the tape recorder will be referred to as Y'. If X is equal to X', the X-voltage comparator 75 will become operative to permit a current to pass therethrough. Similarly, if voltage Y is equal to voltage Y', the Y-voltage comparator will become actuated and will permit a signal to pass through it. Lead 81 connects voltage comparator 75 with an "and"gate circuit member 82 and lead 83 connects the Y-voltage comparator 76 also with such "and" circuit member. If both X and X' are the same and Y and Y' are the same, an appropriate signal is passed through the "and" circuit member via lead 84 back to the magnetic recorder 31 to start the recorder working once more. The renewed operation of the recorder again restarts the input of appropriate programming information into the storage tube 51 to recommence the programming thereon and at the same time sends the appropriate start-up signal back to the projector 53. Thus the program continues.

In resume then where the student has applied the probe to the plate 11, a bright line, in some embodiments, hereof, is shown on the face plate 52 and if the student has answered the question correctly, the program proceeds.

I would note at this point that a certain amount of error may be programmed into the system as is subsequently described. It is not necessary that the student touch an exact point on plate 11 but only the correct "area" thereof. Controlled error or "noise" is or can be part of the program.

The next question to consider is what happens when the student has answered the question wrong. If, for example, an X is required in Answer Box A and has been written on Answer Box B, the X may appear visually on plate 52 where written by the student. This, of course, leaves the student with certain leeway to guess with three answers remaining. In the simple embodiment hereof, the student can do one of two things when he has answered the question wrong in the first instance. He can either wait for a predetermined time after which timer 85 will actuate the tape recorder 31 to start up again with a score of such "overtime response" answers being kept by a simple mechanical counter or in the alternative the student can "guess" and if he guesses the answer rightly the "and" circuit will be actuated and the program proceeds.

In many teaching situations if the student answers the question incorrectly it is desirable to explain to him not only what the correct answer is but to beforehand give some help as to how such correct answer is arrived to and to allow him additional attempts. Such can be readily accomplished by using this teaching system. For this I refer to FIG. 4 of the drawings herein.

Figure 4:
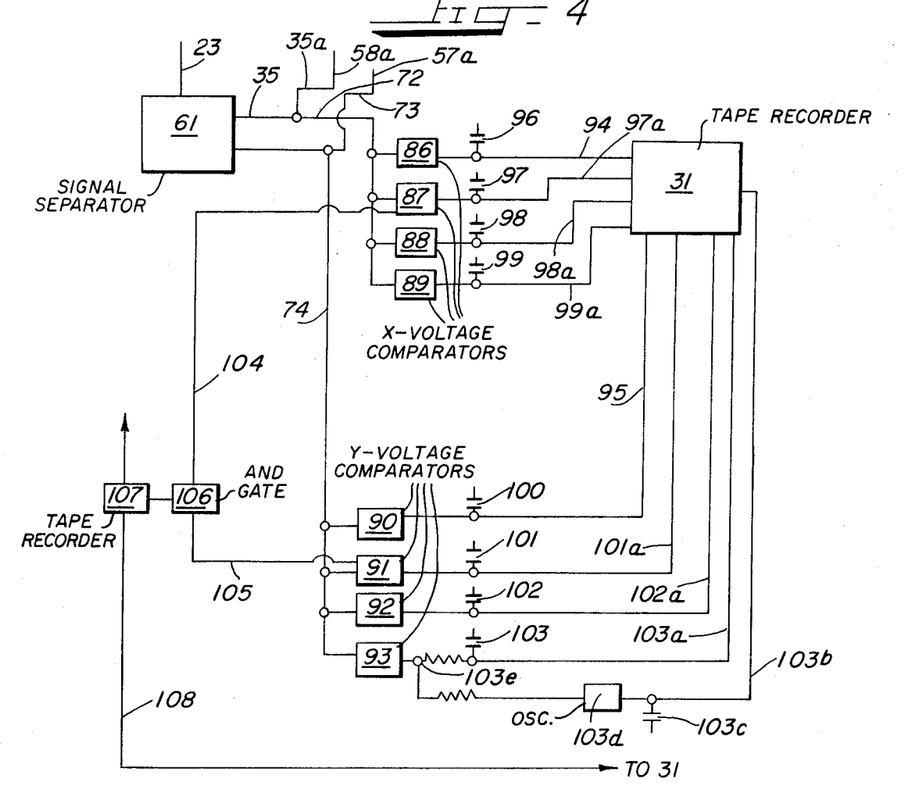
FIG. 4 schematically illustrates some additional electrical circuitry and related apparatus for use herewith.

In such FIG. 4 the numeral 61 refers to the X and Y separator element from the probe and the numeral 31 to the magnetic tape recorder both of which have been previously described. I would first consider the X voltage lead 35 from the filter element 61. As before, this splits into lead 35a, connected to lead 58a, and lead 72. Assume that four answers are posed on the face plate 52, three of which are wrong. Lead 72 feeds into four parallel voltage comparators 86, 87, 88 and 89. For discussion purposes again assuming answers A, B, C and D on the face plate; comparator 86 is actuated if the student answers answer A, 87 if he answers B, 88 if he answers C, and 89 if he answers D. It should be understood, of course, that it is X coordinate voltages that are respectively fed into such comparator members. Similarly the lead 30 carrying the Y coordinate voltage from filter element 61 is split into lead 73 connected to lead 57a and lead 74. The latter lead is connected in parallel to Y coordinate comparator members 90, 91, 92 and 93. The comparator pairs therefor, for answer A are 86 and 90, for answer B, 87 and 91, for answer C, 88 and 92 and for answer D, 89 and 93. Thus if the student applies the probe 13 to the answer A position on plate 11 such plate will not only illustrate the marking formed by the student but an X voltage related to the position will be directed to comparator 86 and a Y voltage related to the position to comparator 90.

The answer X and Y coordinate voltages are programmed on tape 31a in the magnetic recorder 31. On this tape are carriers on tracks for the four voltage signal pairs, namely $X'_a$ and $Y'_a$ for answer A, $X'_b$ and $Y'_b$ for answer B, $X'_c$ and $Y'_c$ for answer C, $X'_d$ and $Y'_d$ for answer D.

For purposes of discussion, again let us assume that the correct answer to the question posed on plate 52 is answer A and that therefore the correct voltage coordinates are $X'_a$ and $Y'_a$. If the student answers the question correctly, the X voltage in lead 72 is fed into comparator 86 and the Y voltage through lead 74 is passed into comparator 90. At an earlier time before the tape recorder shut down, the tape recorder via lead 94 feeds the correct X coordinate voltage and lead 95 feeds the correct Y coordinate voltage into the system. From lead 94, the X voltage coordinate is stored on capacitor 96 and from thence is available to comparator 85 whereas the Y voltage signal is held in capacitor 100 and conveyed to comparator 90. Similarly, signal $X'_b$ is fed into capacitor 97 by lead 97a and comparator 87; signal $X'_c$ into capacitor 98 and comparator 88 by lead 98a and signal $X'_d$ into capacitor 99 and from thence into capacitor 89 by lead 99a. Furthermore, stored signal $Y'_b$ is fed into capacitor 101 and comparator 91 by lead 101a signal $Y'_c$ into capacitor 102 and the capacitor 92 by lead 102a and signal $Y'_d$ into capacitor 103 and comparator 93 by lead 103a.

If the correct answer is A and the student has answered that question properly, the X and Y voltage coordinates from element 61 are fed into comparators 86 and 90, respectively, while the correct programmed signal voltages from the recorder 31 are also fed into the same comparators. In this case, there is actuation of the "and" circuit 82 in exactly the same manner as is disclosed in conjunction with the discussion of FIG. 3.

Now, for the purposes of discussion, let us assume that the student answers the question wrong, that the right answer is A and he actually answers B. The appropriate X and Y voltages for answer B are passed through filter member 61 and lines 35 and 30 to comparators 87 and 91, respectively. When the signal X is fed into comparator 86, the comparator remain inoperative. The same signal, of course, passes into comparator 87. Similarly, comparator 90 remains inoperative because Y does not equal $Y'_a$ and signal Y is conveyed onto $Y'_b$ comparator 91.

Concurrently, the signal $X'_b$ and $Y'_b$ are generated by the tape recorder which in turn triggers comparators 87 and 91. Impulses from these leads 104 and 105, respectively, actuate an "and" gate circuit member 106. When such $X_b$, $Y_b$ circuit member is actuated it initiates the $X_b$, and $Y_b$ controlled magnetic recorder 107. On the magnetic tape of recorder 107 are appropriate signals both to control the output of the electrostatic storage tube 51 and related audio whereby additional instruction is given to the student to explain why answer B is wrong and hinting at or indicating the direction of the correct answer. The $X_b$, $Y_b$ recorder is held inoperative until the main recorder 31 starts again whereupon it advances to the next $X_b$, $Y_b$ commentary and awaits triggering by the $X_b$, $Y_b$ "and" circuit. If no such trigger occurs, the next re-start of recorder 31 will again advance the $X_b$, $Y_b$ recorder one commentary further into the program. When the message as regards a particular question is completed by recorder 107, a signal can be conveyed via lead 108 back to the principal tape recorder 31 to start the principal program once more or the student can be asked to try for the correct answer again.

It should also be noted that while I have only discussed in FIG. 4, the circuit wherein $X_b$, $Y_b$ is actuated, related tape recorders, "and" circuits and leads are used with $X_c$, $Y_c$ and $X_d$, $Y_d$—$X_n$, $Y_n$. By this means the student is given additional audio and visual information if he answers questions incorrectly.

In the discussion thus far, I have considered the comparison of only signals X and X' and signals Y and Y'. It will be obvious to those skilled in this art in view of the spatial nature of the response generator previously described that exact voltage comparisons are somewhat difficult to achieve and will be somewhat less than desirable in actual teaching situations. Therefore, my system may be programmed with a controlled amount of permitted size of the acceptable spatial area to be considered correct. This may be desirable particularly when a relatively large object is to be identified on plates 11 and 52. For example, if the student is requested to point out a tree, the tree involves a certain substantial area and it should not be required in using the system that the student touch a very small point on the plate. This is accomplished by providing a controlled amount of allowable error in the X' and Y' signals from the tape recorder which in turn provide for an area of correct answer space on plate 11. As before, under the control of signals derived from separate tracks or carriers on the table in the playback unit 31, signals are emitted just prior to the shutdown of the tape drive, said shutdown being intended to give the viewer time to respond to the question. These questions can be denoted $\Delta X'_d$ and $\Delta Y'_d$ in the specific case of the fourth answer and are the acceptable errors in $X_d$ and $Y_d$ that will be considered correct. Voltages proportional to $\Delta X'_d$ and $\Delta Y'_d$ are stored on capacitors since the tape recorder is stopped at the time of their use. As shown typically for $\Delta Y'_d$ the voltage of capacitor 103c is applied to an oscillator 103d all in line 103d operating in accordance with standard design and providing an output amplitude of error voltage proportional to input voltages $\Delta Y'_d$. This error voltage is added to the $Y'_d$ signal applied to the comparators by the usual resistor adder shown as 103e. It will now be seen that the comparators 93 will be actuated if voltage $Y_d$ equals $Y'_d + Y'_d$ which is the desired result. Similar programmed error inclusions may be used in conjunction with all of the comparator circuits used herewith. Appropriate carrier frequencies for the $\Delta X$ and $\Delta Y$ signals are put on the tape with amplitudes proportional to the desired allowable spatial errors in X and Y. This is accomplished merely by using calibrated potentiometers to control the out-put amplitude of oscillators. The potentiometers are set by the instructor for each answer or response situation.

If the instructional program being used permits or demands blank, i.e., black, frames may be included in the film strip or the like and at this point only the voice and dynamic glowing display of the storage tube will be perceived by the viewer. In this manner, complex formulae or shapes will be drawn out on the screen to the accompaniment of the teacher's voice. Additionally, for certain programs, no film strip projections will be required at all, for example, when instructing in abstract mathematics.

I would note further that the voltages applied to the Y and X deflection plates 57 and 58 of the storage display tube 51 are slowly varying levels even for the most rapid writing rates used by the human instructor or student. Additionally, the erase-the-display screen clearing signal is an occasional pulse of milli-seconds duration and the beam on-off signal is respectively a positive or negative step of many micro-seconds rise time. Therefore, all of these controlling signals may be derived by simple filtering of the different carrier frequencies recorded on the magnetic tape 31–A in recorder 31 and the corresponding tape in recorder 107 followed by peak detection of rectification. The envelopes of said carriers, in essence, comprise the requisite control information for all four sets of instructions.

In using the systems described above, the background image as displayed on the face plate 52, projected by the film strip projector 53, has superimposed or added thereto the glowing beam of the storage display tube which may be in the process of writing out the scene being superimposed while at the same time the teacher's voice is heard from the audio-commentary track.

Figure 5:
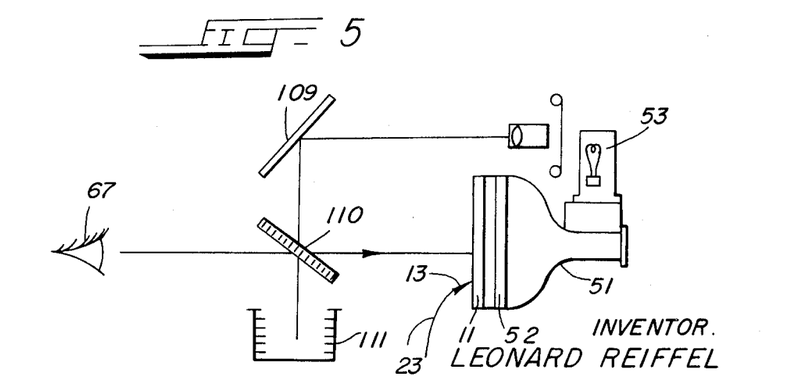
FIGS. 5 and 6 disclose other embodiments hereof employing an electrostatic storage tube.

While the embodiments of my invention previously described present one of the most basic means of superimposing the audio-frequency magnetic tape control dynamic display on the background visual image, I have found that the embodiments set forth in FIG. 5 may be somewhat more convenient. In both of the embodiments illustrated in FIGS. 2 and 5, the lamp of the projector 53 is reduced in intensity so as not to overpower the storage tube display with too bright a background image. In the embodiment illustrated in FIG. 5, mirrors 109 and 110 are employed to direct the background visual image from projector 53 onto the phosphor screen 52 of the storage tube 51 and the viewer looks through the partially silvered mirror 110—really a one-way mirror to see a total combined image. I also provide a light trap 111 to prevent scattered light from that portion of the projector beam not carried onto the phosphor screen by the partially silvered mirror 110 from interfering with perception of the composite image. In the embodiment illustrated in FIGS. 5 and 6, the magnetic tape recorders and related apparatus shown in FIGS. 1 through 4 is likewise employed in conjunction with display tube 51 with the circuitry and components therefor being as previously described.

Figure 6:
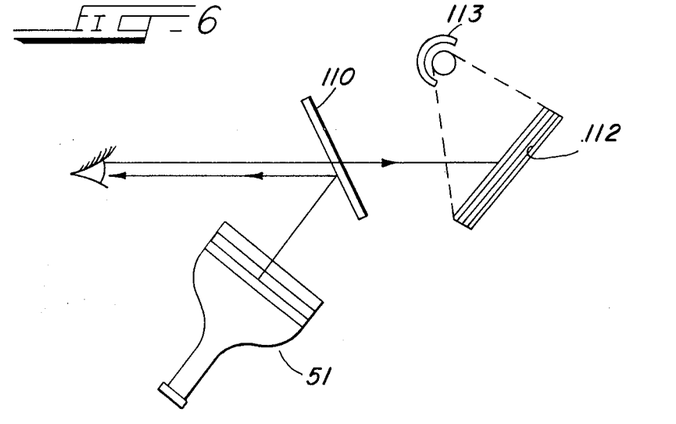

FIG. 6 illustrates another embodiment hereof in which the background visual image is provided by an accurately positioned ordinary book page 112 rather than the projector 53. A partially silvered one-way mirror 110 is angularly positioned between the book page and the viewer's eye. The storage display tube with accompanying apparatus is shown in FIG. 2 is noted again by the numeral 51. Here, also, dynamic linear visual annotations displayed on the storage tube phosphor may be caused to appear superimposed on the page of the book by such optical technique. A light source such as a shielded reading light 113 is used to illuminate the page 112.

Figure 7:
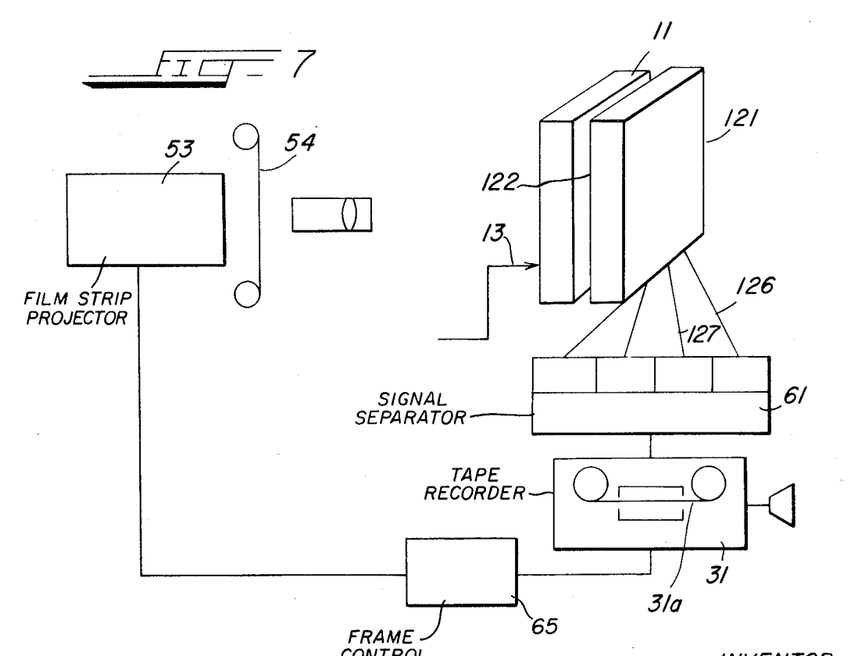
FIGS. 7, 8 and 9 disclose another embodiment hereof using a display apparatus much simpler in construction than the electrostatic storage tube described in conjunction with the previous embodiments.
Figure 8:
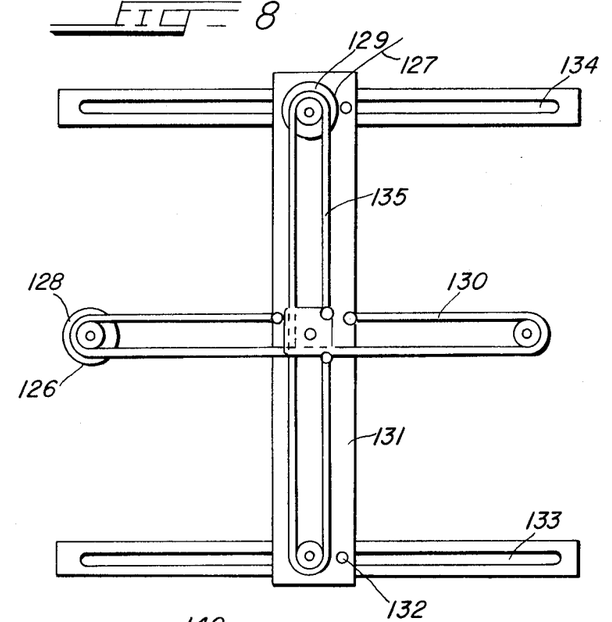
Figure 9:
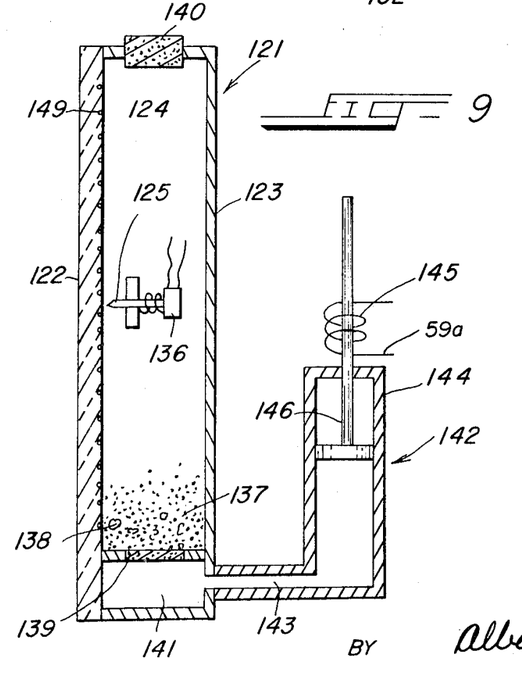

In the embodiments hereof previously illustrated, particularly in FIGS. 2, 5 and 6 an electrostatic storage tube 51 is employed as the means of generating the image being superimposed on the basic image. In another embodiment hereof, the storage tube and its related internal circuitry are replaced by a different type of viewing screen which is simpler in construction and considerably less expensive to manufacture. This additional embodiment of my invention is illustrated in FIGS. 7, 8 and 9. To the viewer the effect of overall system is substantially the same as that which has been previously described and the same functioning in terms of visual image superimposition, audio presentation and control are accomplished but here I provide a viewing plate member denoted generally by the numeral 121 which is of a different structure than that of the electrostatic storage display tube 51. To the teacher-programmer or student-viewer it functions in the same manner.

Here too, I provide a film strip projector 53 with film strip 54 which directs a visual image onto the plate, preferably glass 122 of the plate member 121. The superimposed or instructional image is formed on such plate. As before the signal generator 11 is positioned in front of the viewing member 121.

In order to best understand the structure of the viewing plate 121, reference should next be had to FIG. 9 which is a schematic sectional view through the device. The apparatus has a casing 123 with the front surface thereof comprising a glass plate 122. Alternative to a separate signal generator 11, the plate 122 itself may be coated with a transparent conductive layer serving with probe 13 as the spatial response generator previously described in detail. I note at this point that a similar combination can be made of the display tube 51 face plate and the generator plate 12.

Returning now to the operation of FIGS. 7 through 9, a powder layer 124 is continuously and removably affixed to the inside surface of the glass plate 122. Upon controlled scraping of the powder as, for example, by means of stylus 125 which is able to selectively remove the powder layer under tape recorder or "real time" control. Such powder layer is opaque and reflective to visible light and when it is removed light is permitted to shine through the glass plate. Preferably the powder is aluminum dust although other comparable material can be used. The effect, when the visual image from projector 53 is projected onto the plate 122 and then some of the powder selectively removed by the stylus is comparable to the line being drawn on the face plate 52 of the electrostatic storage display tube.

Movement of stylus 125 to selectively control the removal of portions of the powder layer 124 is under the guidance of the X and Y coordinate signals from the magnetic tape recorder 31 and the magnetic tape 31A or the supplemental recorders, e.g., 107, or "live" and in addition is also controlled as aforesaid by the student input. Similar to the embodiment previously described, signals are fed into member 61 and then via leads 126 and 127 containing conditioning circuits as required to a pair of positional servomotors 128 and 129 (FIG. 8) which move the stylus as required. Component 61 in this embodiment functions exactly as previously discussed.

FIG. 8 schematically illustrates one means of a stylus drive and a positional control mechanism for use in this embodiment of the disclosure. The signals from lead 126 are fed into the X coordinate servomotor 128 and the signals from lead 127 are fed into the Y coordinate servomotor 129. Such motors cause controlled movement of the stylus within casing 123 in much the same manner as the electron beam is controlled in the electrostatic storage tube using the embodiment previously described.

The X coordinate servomotor 128 operates a pulley drive 130. On such pulley drive is a slide bar 131 equipped with locking pins 132 or the like which is movable, horizontally in a lower guide member 133 and upper guide member 134. As illustrated in FIG. 8, clockwise movement of the servomotor 128 moves the slide bar 131 and is free to move horizontally therewith.

The Y coordinate servomotor 129, operates a second pulley drive 135 to which is attached the stylus and the entirety is mounted on slide bar 131. As such servomotor 129 rotates in a clockwise direction, the stylus is moved downwardly and vice versa. This latter servomotor is affixed to the slide bar 131 and moves horizontally therewith. The net result is that stylus position is controlled by the X and Y coordinate signal inputs to the two servomotors.

One must also control the stylus position in terms of the third dimension. When one wishes to "draw" the superimposed image, the stylus point must contact and rub against the inner surface of plate 122 to remove the powder layer 124 therefrom. To avoid the undesirable feature of constantly drawing a line as the stylus moves along its X and Y axis, I provide a solenoid member 136 (FIG. 9) which causes in and out movement at command of such stylus. This is comparable to, in terms of effect, the intensity control member 56 of the electrostatic storage display tube 51 and the control mechanism therefor either from the magnetic tape recorders or directly from the signal generator 11 previously described is the same. A signal on tape 31a is fed via lead 60 to the separator element 61 thence to leads comparable to 56a to actuate the solenoid and withdraw or impress stylus contact with plate 122.

It will, of course, be understood that various other means of moving the stylus in all three directions may be employed. The powder that is scrapped off by the stylus is retained in the casing 123 for reuse to "erase" the line drawings generated by the stylus. This may be accomplished by simply vibrating the plate member 121 or causing air jets to redeposit the powder on the glass plate. Other means, such as applying an electrostatic charge to the powder whereby it is attracted to the plate, may likewise be employed.

One means of "erasing" the line drawing, i.e., to reform the continuous powder layer is illustrated in FIG. 9. For purposes of discussion, the powder that has been scrapped off by the previous action of the stylus an additional supply is denoted by the numeral 137. Optionally, there may be glass beads 138 or the like mixed in with the powder to assist in keeping it loose and mobile and to help generate electrostatic charges thereon. Scrapped-off powder, with or without the glass beads, comes to rest on a porous plate 139 positioned down toward the bottom of the receiver 121. I also provide a porous plug 140 at the top of such receiver. Both said plate and plug are pervious to air but not to the powder and beads. I would also note that by the positioning of plate 139, as illustrated, there is formed a chamber 141 at the bottom of receiver 121.

A simple pulsing pump 142 is connected by conduit 143 to chamber 139. Such pump has a casing 144 and a solenoid 145, actuated piston 146. The solenoid 145 is controlled by lead 59a, the "erase" lead from the tape recorder 31 and the filter member 61. When erasure of the stylus generated lines is required, an electrical pulse actuates the solenoid 45 driving the piston 146 sharply downwardly and thus forcing an air blast into chamber 139 from whence it passes up to and into the main chamber of member 121 where it disperses the powder 137 and assists in reestablishing the continuous powder layer 124. The air escapes through plug 140.

In many of the embodiments hereof, an electrostatic charge on the powder 137 is adequate to cause adherence to such powder to the inner surface of the glass plate 122. However, optionally, one may imbed a grid of fine wires 149 in such plate and charge such said wires during the "erase" cycle to enhance the attraction of the powder to the plate.

It will be evident to those skilled in this art, that by using the system as previously described, the student or viewer sees a combined image, one component coming from the projector 53 or the like and the second component a dynamic glowing line as is generated on the viewing face 52 or 122. The superimposed signal on such face plates is in the first instance generated by the instructor in programming the system and in the second instance may be added to by the student in using the teaching system.

In the embodiment of the viewing plate mechanism illustrated in FIGS. 7 through 9 the same control circuitry is employed whereby different answer voltages are compared and appropriate additional preprogrammined information given as before described.

It also should be noted that while in the foregoing description, I have an audio frequency magnetic recorder to store the programmed information added by the instructor and to compare student answers with the program and furthermore to control the pace of the program it is also possible to operate parts of the system "live." At least insofar as student responses or direct "live" programming by the instructor are concerned, this is possible by eliminating those parts of the circuits using the storage means of the tape recorder. For comparison purposes, however, in answering questions it is preferred that the magnetic tape recorders or the like be used.

Furthermore, in many places in the foregoing system instead of lead lines to convey signals radio communication means can be employed.

It will be understood that various modifications and variations may be affected without departing from the spirit or scope of the novel concepts of my invention.

I claim as my invention:

1. An audio-visual teaching system and student response apparatus comprising:
   a. a display screen means capable of receiving and displaying a first image;

b. an electrically energized spatial response signal generator disposed to operate in close registration with said display screen means capable of generating electrical signals defining the X and Y coordinates of positions thereon;

c. probe means for use by the instructor or a student coating with said signal generator whereby the coordinates of probe position relative to the generator are determined and signals representative thereof are generated;

d. recording/playback means for use with said image display means for storing/presenting predetermined lesson signals and X – Y coordinate information signals representative of answer positions on said response signal generator; and e. comparator means for comparing the X – Y coordinate answer position information from said playback means with that from said probe means.

2. An audio-visual teaching system and student response apparatus comprising:

a. a display screen means capable of receiving and displaying a first image;

b. an electrically energized spatial response signal generator disposed to operate in close registration with said display screen means capable of generating electrical signals defining the X and Y coordinates of positions thereon;

c. probe means for use by the instructor or a student coacting with said signal generator whereby the coordinates of probe position relative to the generator are determined and signals representative thereof are generated;

d. recording/playback means for use with said image display means for storing/presenting X-Y coordinate information signals representative of answer positions on said response signal generator; and e. comparator means for comparing the X-Y coordinate answer position information from said playback means with that from said probe means.

3. An audio-visual teaching system and student response apparatus comprising:

a. a first display screen means for receiving and displaying a first image;

b. a second image display means disposed in close registration with said first screen means and effective to present the effect of having a visual, dynamic linear image superimposed on said first image;

c. an electrically energized spatial response signal generator overlying said first display screen means and electrically interconnected with said second image display means for generating said visual, dynamic linear image;

d. recording/playback means electrically interconnected with said second image display means for storing/displaying in analog form predetermined lesson signals and signals generated by said generator; and e. comparator means for comparing the lesson signals with the signals from said generator whereby the correctness of the generated signals is determined.

4. The system as defined in claim 3 wherein said second image display means comprises an electrostatic storage tube.

5. The system as defined in claim 3 wherein said second image display means has a controllable powder scraping member.

6. The system as defined in claim 3 wherein said means (e) consists of a plurality of members to compare electrical signals and in turn controls supplemental signal generating means.

* * * * *